ns Company,

United States Patent [19]
Manigault

[11] 3,773,531
[45] Nov. 20, 1973

[54] DENSE CHROME REFRACTORY MATERIAL

[75] Inventor: Edward L. Manigault, Cincinnati, Ohio

[73] Assignee: The Chas. Taylor's Sons Company, Cincinnati, Ohio

[22] Filed: July 13, 1972

[21] Appl. No.: 271,604

[52] U.S. Cl.................................. 106/57, 106/66
[51] Int. Cl. .................... C04b 35/12, C04b 35/16
[58] Field of Search............................... 106/57, 66

[56] References Cited
UNITED STATES PATENTS

| | | | |
|---|---|---|---|
| 2,498,622 | 2/1950 | Mochel | 106/66 |
| 3,080,135 | 3/1963 | Steijn | 106/66 |
| 3,181,958 | 5/1965 | Thomas | 106/66 |

Primary Examiner—James E. Poer
Attorney—Robert L. Leham et al.

[57] ABSTRACT

A dense chrome refractory material having superior corrosion resistance to molten glass has been prepared, said refractory comprising from 85 percent to 98 percent chromic oxide, from 1 percent to 10 percent zircon and from 0.5 percent to 5 percent of a titanium compound selected from the group consisting of barium titanate and titanium dioxide.

7 Claims, No Drawings

DENSE CHROME REFRACTORY MATERIAL

BACKGROUND OF THE INVENTION

Chrome refractories have been used in the past in the glass industry. Such chrome refractories however, suffered from the disadvantages of being relatively porous and therefore subject to high corrosion attacks. Improvements have been made recently in the chrome refractories by employing small quantities of barium titanate which in turn decreased the porosity and increased the corrosion resistance of the chrome refractory material.

It has now been found, however, that a dense chrome refractory having a very low porosity and high corrosion resistance has been produced which is superior to the chrome refractories previously produced.

It has also been found that the new type of chrome refractory may be produced without the tendency to crack and split during firing which was very difficult to prevent with the prior art chrome refractory compositions.

SUMMARY OF THE INVENTION

A dense chrome refractory material has been produced comprising from 85 percent to 98 percent chromic oxide, from 1 percent to 10 percent zircon and from 0.5 percent to 5 percent of a titanium compound selected from the group consisting of barium titanate and titanium dioxide. This refractory material possesses very low porosity, has high corrosion resistance to molten glass, and in addition, has good resistance to thermal cracking during firing.

DESCRIPTION OF THE PREFERRED EMBODIMENTS

In preparing the chrome refractory material of the instant invention, all of the ingredients should be ground to −325 mesh.

The chromic oxide used in the refractory composition should be of high purity, i.e., preferably the so-called "technical" grade chromic oxide having a purity of at least 97 percent.

In preparing the refracotyr blocks, the ceramic mixture is formed by admixing the chromic oxide with from 1 percent to 10 percent zircon and from 0.5 percent to 5 percent barium titanate or titanium dioxide, the percentages based on the weight of the chromic oxide.

Blocks are formed from the mixture by either slip casting or isostatic pressing the mixture into the form of blocks and firing the blocks at a temperature between 1500°C and 1650°C, preferably between 1560°C and 1600°C. If the slip casting process is used, it is usually necessary to add a small amount of deflocculating agent when forming the slip-cast pieces.

The blocks formed possess very low porosity, and high corrosion resistance to molten glass. In addition, they are very resistant toward cracking during firing.

Chrome refractory blocks produced by the prior art commonly develop cracks on the bottom surface of the block where they contact the setter tile. This cracking probably is due to the movement caused by the bottom face shrinkage and its dragging across the setter tile. This is an indication of having an insufficient bond between the particles at the temperature where the shrinkage occurs.

When the chrome blocks are made having the composition of the instant invention, these cracks do not develop in the block despite the fact that their firing shrinkage is substantially identical to the prior art chrome blocks described above.

In order to describe the instant invention more fully, the following examples are presented:

EXAMPLE 1

In this example 95 kg of "technical" grade chromic-oxide, having a purity of 98.5% $Cr_2O_3$ were mixed with 3 kg of zircon and 2 kg of barium titanate. All of the ingredients were ground to −325 mesh. The mixture was dry blended for 3 minutes. 3 kg of a 5 percent aqueous solution of an alkyl-phosphate lubricant were added to the mixture and the mixture was then wet blended for 8 minutes.

Blocks 3 ½ × 5 × 18 inches were isostatically pressed at 15,000 psi and decompressed at 3 minutes per inch of block thickness, based on the green size. The pressed blocks were then air dired for one week.

The dried blocks were then set on end in a kiln, protected by a 3 inch bagwall and fired at 1593°C at 18°C rise per hour and were held at that temperature for 8 hours. After heating, the blocks were allowed to cool at a rate of 28°C per hour until a temperature of 93°C was reached when they were removed from the furnace.

The fired blocks were examined and possessed the following properties:

Porosity — 1.0 percent
Absorption — 0.2 percent
Bulk Density — 4.56 g/cc
Tendency to Crack — None The blocks were then subjected to a corrosion test in which the blocks were cut into a rectangular test bar 1 ½ cm by 1 ½ cm by 10 cm.

The test bar was then submerged to a depth of 3 cm along the 10 cm dimension in a molten glass batch (fiber glass type) which had been heated to 2700°F and the test bar was held in the molten bath for 120 hours.

After removal from the molten glass, the extent of corrosion was found by comparing post-test measurements with the original measurements. The measurements were taken at the junction of the glass surface and the test bar (called the metal line), at 1 cm below and at 0.5 cm above the metal line. The change in measure-ments were recorded as the amount of corrosion which took place.

The loss in length at its metal-line was 0.34 mm while the loss 1 cm below the metal line was 0.10 mm and 0.5 cm above the metal line was 0.16 mm.

EXAMPLES 2–5

The procedure of Example 1 was repeated except that various amounts of zircon and chromic oxide were employed. In Examples 2 and 3 the amount of zircon was increased, while in Example 4 rutile titanium dioxide was used in place of barium titanate. In Example 5 the procedure of Example 1 was repeated except that the blocks were formed by slip casting.

Again in all of the examples, improved results were obtained. The results along with the controls are presented in the following table:

|  | Examples | | | | | Control | Prior art |
|---|---|---|---|---|---|---|---|
|  | 1 | 2 | 3 | 4 | 5 | | |
| Chromic oxide, kg | 95 | 93 | 91 | 95 | 92 | 100 | 98 |
| Zircon, kg | 3 | 5 | 7 | 3 | 5 | 0 | 0 |
| Barium titanate, kg | 2 | 2 | 2 | 0 | 3 | 0 | 2 |
| Titanium dioxide, kg | 0 | 0 | 0 | 2 | 0 | 0 | 0 |
| Porosity, percent | 1.0 | 1.36 | 0.3 | 0.3 | 3.4 | 44.0 | 5.0 |
| Absorption, percent | 0.2 | 0.3 | 0.1 | 0.1 | 0.7 | 15.2 | 1.0 |
| Bulk density, gm./cc | 4.56 | 4.48 | 4.3 | 4.63 | 4.57 | 2.9 | 4.76 |

EXAMPLES

| | 1 | 2 | 3 | 4 | 5 | Control | Prior Art |
|---|---|---|---|---|---|---|---|
| Tendency to crack | none | none | none | none | none | badly | badly |

| EXAMPLES | | | | Prior |
|---|---|---|---|---|
| Corrosion | 1 | 2 | 3 | Art |
| Metal-line loss, mm | 0.34 | 0.33 | 0.35 | 0.36 |
| Loss 1 cm below metal line, mm | 0.10 | 0.09 | 0.12 | 0.15 |
| Loss 0.5 cm above metal line, mm | 0.16 | 0.17 | 0.17 | 1.19 |

From the above data, it has clearly been shown that the blocks made with the combination of zircon and titanium compound possessed lower porosity and absorption than blocks which contained no zircon. In addition the corrosion loss was less in the examples employing the composition of the instant invention than that obtained by the prior art chrome refractory. Also there was no tendency for the refractories of the instant invention to crack while those of the prior art cracked readily.

While this invention has been described and illustrated by the examples shown, it is not intended to be strictly limited thereto, and other variations and modifications may be employed within the scope of the following claims.

I claim:

1. A dense chrome refractory composition comprising from 85 percent to 98 percent chromic oxide, from 1% to 10% zircon and from 0.5 percent to 5 percent of a titanium compound selected from the group consisting of barium titanate and titanium dioxide.

2. Composition according to claim 1 in which the titanium compound employed is barium titanate.

3. Composition according to claim 1 in which the titanium compound employed is rutile titanium dioxide.

4. A method for the preparation of a dense chrome refractory composition which comprises admixing chromic oxide, zircon and a titanium compound selected from the group consisting of barium titanate and titanium dioxide, the amount of chromic oxide being from 85 percent to 98 percent, the amount of zircon being from 1 percent to 10 percent and the amount of the titanium compound being from 0.5 percent to 5 percent, all of the percentages being expressed by weight, forming said mixture into a shaped body and firing the body at a temperature from 1500°C to 1650°C to form the refractory composition.

5. Method according to claim 4 in which the shaped body is fired at a temperature from 1560°C to 1600°C.

6. Method according to claim 4 in which the titanium compound employed is barium titanate.

7. Method according to claim 4 in which the titanium compound employed is rutile titanium dioxide.

* * * * *